(12) United States Patent
Kawase

(10) Patent No.: US 6,742,130 B1
(45) Date of Patent: May 25, 2004

(54) INTERFACE APPARATUS, CONTROL METHOD THEREFOR, AND INFORMATION RECORDING MEDIUM

(75) Inventor: Yuji Kawase, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/582,913

(22) PCT Filed: Nov. 9, 1999

(86) PCT No.: PCT/JP99/06236

§ 371 (c)(1),
(2), (4) Date: Aug. 1, 2000

(87) PCT Pub. No.: WO00/28402

PCT Pub. Date: May 18, 2000

(30) Foreign Application Priority Data

Nov. 9, 1998 (JP) .......................................... 10/317616
Nov. 9, 1998 (JP) .......................................... 10/317617

(51) Int. Cl.⁷ ............................... G06F 1/26; G06F 1/32
(52) U.S. Cl. ....................... 713/300; 713/320; 713/322; 713/323; 713/324; 710/14
(58) Field of Search ................................. 713/320, 500, 713/300, 322, 323, 324, 330; 710/14

(56) References Cited

U.S. PATENT DOCUMENTS

| | | | |
|---|---|---|---|
| 5,477,476 A | 12/1995 | Schanin et al. | |
| 5,532,935 A | 7/1996 | Ninomiya et al. | |
| 5,581,668 A | 12/1996 | Oida et al. | |
| 5,652,891 A | 7/1997 | Kitamura et al. | |
| 5,682,273 A | * 10/1997 | Hetzler | 360/75 |
| 5,821,924 A | * 10/1998 | Kikinis et al. | 345/212 |
| 5,894,579 A | 4/1999 | Fujihara | |
| 5,954,820 A | * 9/1999 | Hetzler | 713/323 |
| 6,493,100 B1 | * 12/2002 | Endo et al. | 358/1.14 |

FOREIGN PATENT DOCUMENTS

| | | |
|---|---|---|
| EP | 0 526 189 A2 | 2/1993 |
| EP | 0526189 A2 * | 3/1993 |
| EP | 0 657 846 | 6/1995 |
| EP | 0 679 983 | 11/1995 |
| EP | 0 683 451 | 11/1995 |
| JP | 5-32013 | 2/1993 |
| JP | 05-035379 | 2/1993 |
| JP | 9-237138 | 9/1997 |
| JP | 09-300780 | 11/1997 |
| JP | 10-136049 | 5/1998 |

OTHER PUBLICATIONS

Barua, Susamma. "JINI Enabled Printer Interface (JEPI)" Systems, Man and Cybernetics, 2002 IEEE International Conference, On pages(s): 176–181, vol.: 2, 2002.*

* cited by examiner

Primary Examiner—Thomas Lee
Assistant Examiner—James K. Trujillo

(57) ABSTRACT

An interface apparatus having a power-saving function, a control method therefor and an information-storing medium are provided. In the interface apparatus having a receiving means for receiving data from a first host unit and a sending means for sending the data received by the receiving means from the first host unit to a second host unit, a wait-state selecting means for selecting a predetermined wait state from a plurality of wait states according to operation of one of the receiving means and the sending means is provided. The state is shifted to a power-saving state as and when required, thereby allowing power consumption to be reduced; and concurrently, transition to the power-saving state is controlled via the host, thereby allowing commands to be transferred at a high speed. In addition, information required for saving power is received from the host, thereby allowing independently determine a power-saving mode.

33 Claims, 11 Drawing Sheets

| | 401 | |
|---|---|---|
| 403 | 404 | 405 |
| LP-1500 | 10W | 15W |
| LP-1700 | 11W | 16W |
| LP-2000 | 13W | 17W |
| LP-3000 | 18W | 20W |
| LP-8000 | 25W | 30W |
| ⋮ | ⋮ | ⋮ |

INTERFACE APPARATUS, CONTROL METHOD THEREFOR, AND INFORMATION RECORDING MEDIUM

TECHNICAL FIELD

The present invention relates to an interface apparatus, a control method therefor, and an information-recording medium; particularly, the invention relates to an interface apparatus that allows data and commands to be transferred between two hosts so as to serve as an interface for communication therebetween, and shifts to a power-saving state as and when required, thereby allowing power consumption to be reduced, and concurrently, that controls transition to the power-saving state in accordance with the hosts to allow data and commands to be transferred at a high speed; a control method for the interface apparatus; and an information-recording medium for recording a program for controlling the interface apparatus.

BACKGROUND ART

As an interface apparatus that serves as an interface for transmission of data and commands between two hosts, an interface apparatus in which one of the hosts is a computer and the other one of the hosts is a printer, an interface apparatus that serves as a hub for connecting multiple hosts, for example, for connecting a computer and a computer, and other various types of interface apparatus are provided.

For sending data and commands from a computer to a printer, various cases where they are sent via various types of paths. For example, there are cases where they are sent via a parallel port and an RS-232C port that are included in a computer and where they are sent via a bus widely used in recent years, such as that according to USB (Universal Serial Bus) or according to IEEE (Institute of Electrical and Electronic Engineers) 1394.

Thus, the type of connector differs in various ways depending on standards. The connection status on the side of computers may be variable; however, hardware of printers is preferably common. In this situation, an interface apparatus first receives data and commands to be sent through the aforementioned various types of connections and performs voltage-conversion, impedance-matching, buffering of the sent data and commands, and interpretation and filtering thereof; and thereafter, it converts them to, for example, the RS-232C format, and outputs them.

Thus, by exchanging the interface apparatus, a single printer can be used to meet various conditions. That is, depending on combination of the interface apparatus and the printer, the printer that corresponds to various types of connectors can be provided. Thereby, printers can be massproduced, thereby allowing costs required for the entire printing unit to be reduced.

On the other hand, for the interface apparatus, reduction in power consumption is preferable in view of operation costs and environment protection. For these reasons, many computers and printers are designed to shift to a powersaving state independently of each other while they are not used for a predetermined period of time.

Also, in the described type of the interface apparatus, the reduction in the power consumption is preferable in view of operation costs and environment protection. As powersaving modes for reducing power consumption, there are methods such as that a clock level of a CPU (central processing unit) that controls an interface apparatus is lowered, and intermittent operations are performed, in which the power-saving modes can be varied by specifying various parameters for the lowering level of the clock, the intermittent-operation rate, and the like.

However, the conventional interface apparatus arise problems as described below.

That is, while a first host such as a computer and a second host such as a printer have been developed so as to meet the power-saving requirements and so as to reduce power consumption, almost no development has been implemented for the interface apparatus for the power-saving requirements. Therefore, problems arise in that operation costs increase. These problems are not preferable also in view of the environment protection.

Also, since the two hosts shift to the power-saving state independently of each other, only one of the hosts is used to control the entire power-saving function of the interface apparatus. This is not practical, because the power-saving status in the other one of the hosts must be considered.

Therefore, a preferable interface apparatus is such that it recognizes the status of the two hosts, and concurrently, providing the power-saving function according to instructions from the hosts.

Also, a desired power-saving mode differs in a case where it is implemented in a printer that has a high powersupplying capacity and in a case where it is implemented in a printer that has a lower power-supplying capacity. However, in the conventional interface apparatus, no measures are taken for the power-saving mode that differs according to the difference in the power-supplying capacity. Therefore, problems arise in that power consumption cannot be sufficiently reduced.

The present invention is made to solve the abovedescribed problems, and an object thereof is to provide an interface apparatus that allows data and commands to be transferred between two hosts so as to serve as an interface for communication therebetween, and shifts to a powersaving state as and when required, thereby allowing power consumption to be reduced, and concurrently, that controls transition to the power-saving state in accordance with the hosts to allow data and commands to be transferred at a high speed; a control method for the interface apparatus; and an information-recording medium for recording a program for controlling the interface apparatus.

Also, another object of the present invention is to provide an interface apparatus that receives power required for operation from a connected host, and also, that receives information required for saving power from the host so as to independently determine a power-saving mode; a control method for the interface apparatus; and an informationrecording medium for recording a program for controlling the interface apparatus.

DISCLOSURE OF THE INVENTION

In order to achieve the aforementioned objects, an interface apparatus of the present invention has a receiving means for receiving data from a first host unit and a sending means for sending the data received by the receiving means from the first host unit to a second host unit, characterized by comprising a wait-state selecting means for selecting a predetermined wait state from a plurality of wait states according to operation of one of the receiving means and the sending means.

In this case, it is preferable that the wait-state selecting means comprise a control-command detecting means for interpreting the data received from the first host unit to extract control commands, a normal-wait-state selecting means for selecting a normal-wait state when the data was found by the control-command detecting means to be data other than a control command, a command-wait-state selecting means for selecting a command-wait state when the data was found to be a control command according to the control-command detecting means, a command-completion recognizing means for recognizing completion of a control command extracted by the control-command detecting means, a command-wait-state resetting means for resetting the command-wait state and selecting the normal-wait state when completion of the control command is recognized according to the command-completion recognizing means, a first clocking means for clocking time passed after the normal-wait state is selected, and a power-saving-wait-state selecting means for resetting the normal-wait state and selecting a power-saving wait state when a predetermined time was found to have been passed after the normal-wait state is selected according to the first clocking means.

According to the described characteristics, the interface apparatus that allows data and commands to be transferred between two hosts so as to serve as an interface for communication therebetween, and shifts to a power-saving state as and when required, thereby allowing power consumption to be reduced, and concurrently, that does not shift to the power-saving wait state during command reception, thereby allowing commands to be transferred at a high speed.

Also, in the above, it is preferable that the interface apparatus further comprise a first notifying means for posting a notification to the first host unit when the power-saving wait state is selected by the power-saving-wait-state selecting means.

The above characteristics allow the provision of the interface apparatus wherein the first host can recognize a current status of the interface apparatus.

Also, in the above, it is preferable that the interface apparatus further comprise second notifying means for posting a notification to the second host unit when the power-saving wait state is selected by the power-saving-wait-state selecting means. These characteristics allow the provision of the interface apparatus wherein the second host can recognize a current status of the interface apparatus. Particularly, according to the aforementioned notification, the second host can independently shift to the power-saving wait state.

Also, in the above, it is preferable that the wait-state selecting means comprise a second clocking means for clocking time passed after the power-saving wait state is selected, and a power-saving-wait-state resetting means for resetting the power-saving wait state and selecting the normal-wait state when a predetermined time was found to have been passed after the power-saving wait state is selected according to the second clocking means. According to these characteristics, the interface apparatus that repeats the power-saving state and the normal-wait state at a predetermined cycle so as to response to data and commands at a high speed can be provided.

Also, in the above, it is preferable that the interface apparatus further comprise a third notification means for posting a notification to the-first host unit when the power-saving wait state is reset by the power-saving-wait-state resetting means. These characteristics allow the provision of the interface apparatus wherein the first host can recognize a current status of the interface apparatus.

Also, in the above, it is preferable that the interface apparatus comprise a fourth notification means for posting a notification to the second host unit when the power-saving wait state is reset by the power-saving-wait-state resetting means. These characteristics allow the provision of the interface apparatus wherein the second host can recognize a current status of the interface apparatus.

Also, in the above, it is preferable that the interface apparatus comprise a control-command interpreting means for interpreting a control command detected by the control-command detecting means, and a power-saving-wait-state inhibiting means for inhibiting selection of the power-saving wait state by the power-saving-wait-state selecting means when a predetermined control command is interpreted by the control-command interpreting means. These characteristics allows the provision of the interface apparatus that can control transition to the power-saving wait state via the first host and that inhibits the transition, thereby allowing data and commands to be transferred at a high speed.

Also, the interface apparatus of the present invention is characterized by further comprising a power-supplying means that has a plurality of power-saving modes and that supplies power supplied from the first host unit to the interface apparatus, wherein the wait-state selecting means comprises power-information receiving means for receiving power-supplying capacity information on the first host unit via the sending and receiving means, and a first determining means for determining the power-saving mode employed by the power-supplying means according to the power-supplying capacity information on the first host unit, which was received from the power-information receiving means.

The above characteristics allows the provision of the interface apparatus that receives power required for operation from the connected host and obtains information required for saving power from the host, thereby being capable of independently determining the power-saving mode.

In the above, it is preferable that the wait-state selecting means comprise a storing means for storing a pair of device-type-name information on the first host and the power-supplying capacity information on the first host; the power-supplying capacity information on the host, which is received from the power-information receiving means, includes the device-type-name information on the first host; and the determining means searches the storing means on the key of data of the device-type-name information on the host, which was received from the power-information receiving means and determines the power-saving mode employed by the power-supplying means according to the obtained power-supplying capacity information on the first host. These characteristics allows the provision of the interface apparatus that can determine a mode most suitable to the power-supplying capacity of a host even in a case where the host has no function for sending power-supplying capacity information while it can send the device-type name.

Also, in the above, it is preferable that the wait-state selecting means comprise a second determining means for recognizing variation in either one of voltage and current or the both of power supplied by the first host, thereby determining the power-saving mode employed by the power-supplying means. These characteristics allows the provision of the interface apparatus that experimentally measures the power-supplying capacity of a host even in a case where the host can not send the power-supplying capacity information nor can it send information on the device-type name, thereby determining the power-saving mode most suitable to the power-supplying capacity of the host.

Also, the present invention is very effective as a control method for an interface apparatus. It can be understood when it is considered by replacing the described configuration of the interface apparatus with the control method. In addition, when the control method can be implemented using a computer, an information-storing medium containing a control program therefor is also included in the scope of the present invention. In this case, it is preferable that the information-storing medium be one of a compact disk, a floppy disk, a hard disk, an optical magnetic disk, a digital videodisk, and a magnetic tape.

The invention of the information-storing medium allows the information-storing medium containing the program to be distributed or sold independently of the interface apparatus. By execution of the program in the interface apparatus, the interface apparatus and the control method therefore according to the present invention are realized.

Particularly, any one of the compact disk (so-called a CD-ROM), the floppy disk, the optical magnetic disk, a digital videodisk (so-called a DVD-ROM), and a magnetic tape may be employed as the information-storing medium containing the program. Using one of these information-storing medium, these programs can be installed in existing interface apparatuss.

In addition, these programs can be registered at a WWW (World Wide Web) site so as to allow users to download and install them on existing interface apparatuss. These embodiments are also included in the technical scope of the present invention.

In the above and hereinbelow, a printer as a host and a computer as another host are individually employed and described. However, other electronic information apparatuses can be easily employed as hosts, and embodiments so arranged are also included in the technical scope of the present invention.

Also, the interface apparatus of the present invention can be applied to a network hub, a modem, or the like that serve as an interface for multiple units such as computer. Embodiments so arranged are also included in the technical scope of the present invention.

Furthermore, an embodiment that can be considered may be such that, between a printer and an interface board to be equipped with the printer, the interface board supplies power to the printer. In this case, the printer corresponds to the "interface apparatus", and the interface board corresponds to the "host". An embodiment so arranged is also included in the technical scope of the present invention.

BRIEF DESCRIPTION OF THE DRAWINGS

In the drawings, wherein like reference symbols refer to like parts:

FIG. 9 is an explanatory drawing showing data on device-type names and power-supplying capacities of the fourth example of the embodiment of the power-saving determining processing of the interface apparatus according to the present invention.

REFERENCE NUMERALS

Figure 1:
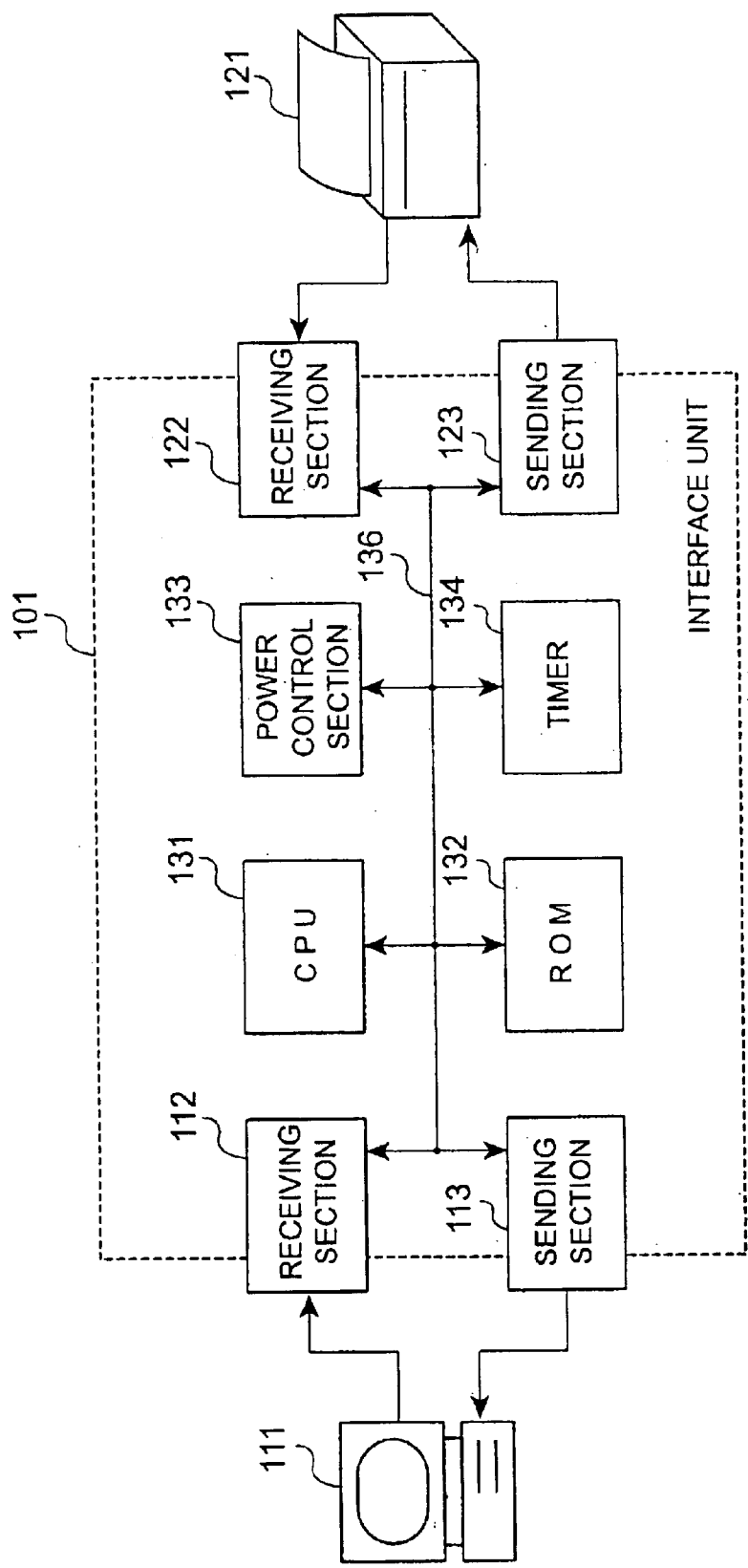
FIG. 1 is a block configuration view of an example of an embodiment of an interface apparatus according to the present invention.

101 interface apparatus
111 first host
112 first receiving section
113 sending section
121 second host
122 second receiving section
123 sending section
131 CPU
132 ROM
133 power control section
134 timer
135 RAM
136 bus
201 normal-wait state
202 power-saving state
203 command-wait state
211 first transition
211a first-a transition
212 second transition
213 third transition
214 fourth transition
215 fifth transition
216 sixth transition
401 table
402 device-type record
403 area for device-type name
404 area for peak-time supply capacity
405 area for peak-time supplying capacity

BEST MODE FOR CARRYING OUT THE INVENTION

Hereinbelow, an embodiment of the present invention is described. Embodiments explained below are just for explanation; therefore, they do not restrict the technical scope of the present invention. The business as the applicant is allowed to employ embodiments rearranged by equivalently converting the individual embodiments, and the embodiments thus rearranged are included in the technical scope of the present invention.

FIG. 1 is a block configuration view of an example of the embodiment of the interface apparatus according to the present invention. Hereinbelow, referring to FIG. 1, description will be given of the configuration of the example of the embodiment according to the present invention.

In an interface apparatus 101, a receiving section 112 receives data and commands that are sent from a first host 111 (for example, a computer), and also, the data and commands are sent from a second sending section 123 to a second host 121 (for example, a printer). This is a basic flow of data and commands. However, with the additional provision of a second receiving section 122 and a first sending the data and the commands can be adversely sent from the second host 121 to the first host 111.

When a section such as the first receiving section 112 receives data and commands, an interrupt is generated for a CPU 131 (central processing unit), and the CPU 131 executes reception-interrupting processing. Thus, the CPU 131 controls transmission. A program for implementing control that is executed by the CPU 131 is stored in a ROM 132 (read-only memory). When the interface apparatus 101 is powered on, the CPU 131 reads out the program therefrom and executes it.

In addition to the aforementioned functions, by using the first sending section 113, a notification on a current status of the interface apparatus 101 can be posted to the first host 111. An embodiment excluding the aforementioned sending section 113 is also included in the technical scope of the present invention.

The second sending section 123 sends commands and data that are sent from the first host 111, and in addition, can post a notification on a current status of the interface apparatus 101 to the second host 121. p A power control section 133 controls electrical current, voltage, clocks, and the like, which are fed to sections such as the CPU 131, the first receiving section 112, the sending section 113, the second receiving section 122, and the second sending section 123. Thereby, it either turns them to a power-saving state or returning them in the power-saving state to a normal state.

A timer 134 is used to check whether or not a predetermined time has passed. The CPU 131 issues commands to the power control section by referring to passed time clocked by the timer 134.

Data can be exchanged among the first receiving section 112, the sending section 113, the second receiving section 122, the second sending section 123, the CPU 131, and the ROM 132 via a bus 136.

To flow data and commands from the side of the first host 111 to the bus 136, the first receiving section 112 performs conversion of voltage, current, impedance, frequency, protocols (communication procedures), and the like. To flow data and commands from the bus 136 to the side of the second host 121, the second sending section 123 performs conversion of voltage, current, impedance, frequency, protocols, and the like. Depending on the case, the CPU 131 can govern the aforementioned conversion.

Also, a RAM (random access memory), not shown, may be connected to the bus 136. In this case, the RAM may be used either as a temporary storage area or as a buffer area for data and commands that are transferred.

The first receiving section 112 functions as a receiving means; the second sending section 123 functions as a sending means; the CPU 131 functions as a shifting means for first to sixth transitions and a setting means in cooperation with, for example, the timer 134 and the power control section 133; the sending section 113 functions as first and third notifying means; and the second sending section 123 functions as second and fourth notifying means.

Figure 2:
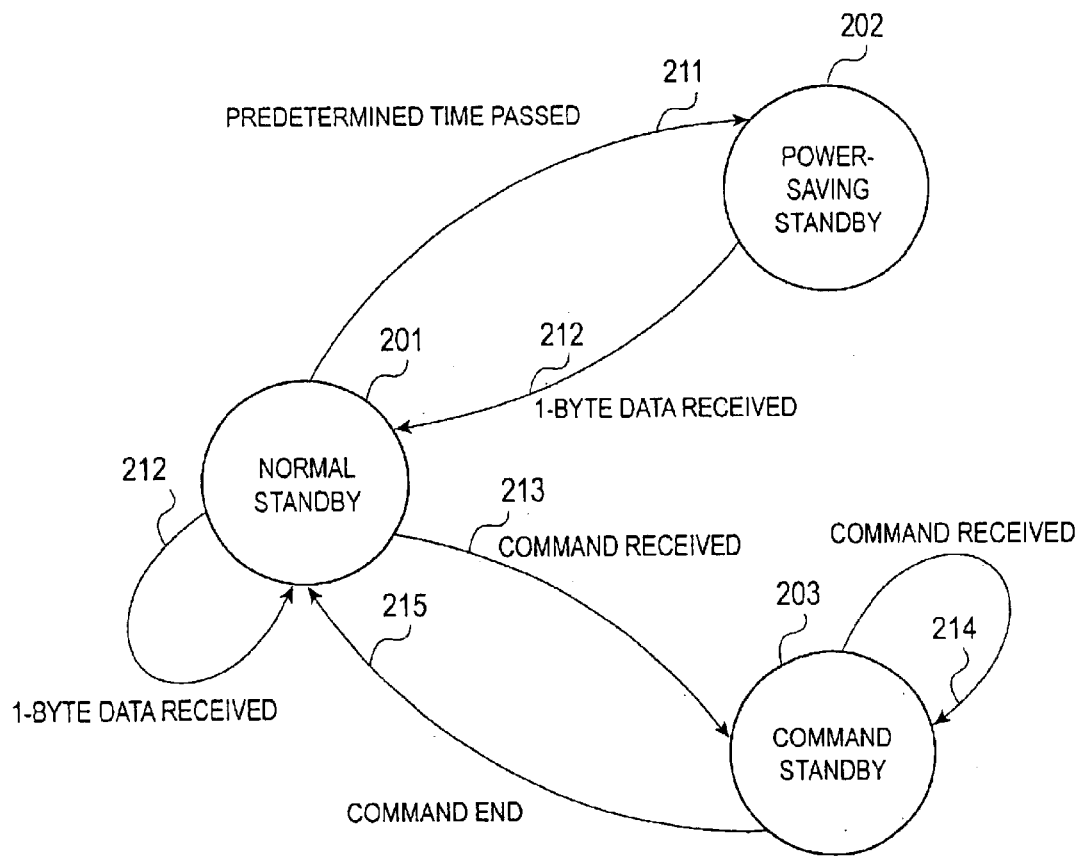
FIG. 2 is a state-transitional view of a first example of an embodiment of an interface according to the present invention.

FIG. 2 shows a state-transitional view of a first example of the embodiment of the interface apparatus according to the present invention. Hereinbelow, referring to FIG. 2, a description will be given of an operational flow according to the first example of the interface apparatus according to the embodiment of the present invention.

After powered on, the interface apparatus 101 is in a normal-wait state 201. The timer 134 clocks passed time after it turned to the normal-wait state 201.

When a passed time clocked by the timer 134 exceeds a predetermined time (for example, 10 seconds), the CPU 131 drives the power control section 133 and shifts the entire interface apparatus 101 to a power-saving state 202. This is a first transition 211.

On the other hand, either in a time when the predetermined time from the time when the state turned to the normal-wait state 201 has not yet passed or in the power-saving state 202, if the first receiving section 112 receives data sent from the first host, an interrupt is generated for the CPU 131. In interrupt processing, either the data is sent to the second host 121 via the second sending section 123 or the data is buffered in the RAM; thereby, transmission is reserved. In addition, the state shifts to the normal-wait state 201. This is a second transition 212.

Regarding methods for identifying whether a received byte is data or a command, a description will be given later.

Either in a time when the predetermined time from the time when the state turned to the normal-wait state 201 has not yet passed or in the power-saving state 202, if the first receiving section 112 receives a command sent from the first host, an interrupt is generated for the CPU 131. In interrupt processing, either the command is sent to the second host 121 via the second sending section 123 or the command is buffered in the RAM; thereby transmission is reserved. In addition, the state shifts to a command-wait 203. This is a third transition 213.

In most cases, commands are sent in series, or a large number of commands are sent. Therefore, it is preferable that the state is arranged so as not to shift to the power-saving state 202. Also, generally, it takes time for the state to return from the power-saving state, the above is preferable to prevent reduction in throughput, which is caused thereby. In the present embodiment, the state cannot be shifted from the command-wait 203 to the power-saving state 202.

In the command-wait 203, if the first receiving section 112 receives a command sent from the first host, an interrupt is generated for the CPU 131. In interrupt processing, either the command is sent to the second host 121 via the second sending section 123 or the command is buffered in the RAM; thereby transmission is reserved. The state remains in the command-wait 203. This is a fourth transition 214. This is intended for performing high-speed transfer for the command.

In the command-wait 203, if completion of a command is detected, the state shifts to the normal-wait state 201. This is a fifth transition 215. The shift is provided for the reason that, since the command transmission from the first host 111 is completed, the state is returned to the normal-wait state 201 wherefrom the state is ready to shift to the power-saving state 202.

Thus, the state is shifted as required from the normal-wait state 201, the power-saving state 202, or the command-wait 203 that corresponds to data and the command sent from the first host 111 and the passed time clocked by the timer 134. Thereby, two objects for high-speed transfer and power-saving can be achieved.

In this connection, for identification of data and a command so that the command completion can be detected, the methods as described below can be considered.

A first method is according to an embodiment that differentiates the format of data to be sent for the command and data. An example method is such that, in a case where communication is performed in the units of eight bits, that is, one byte, values (128 to 255, or 0×80 to 00×ff in the hexadecimal notation) each having the highest-order bit turned ON are used for a command, and values (0 to 127, or 0×00 to 0×7f in the hexadecimal notation) each having the highest-order bit cleared are used for data.

In this case, a method that can be used is such that, in the command-wait 203, when one byte is received, first of all, the one byte is sent to (reserved in) the second host 121, then, verification is performed whether or not the highest-order bit of the one byte is turned ON. If it is turned ON, the command-wait 203 is allowed to continue according to the fourth transition 214. If it is not turned ON, the state is shifted to the normal-wait state 201 according to the fifth transition 215.

Figure 3A:
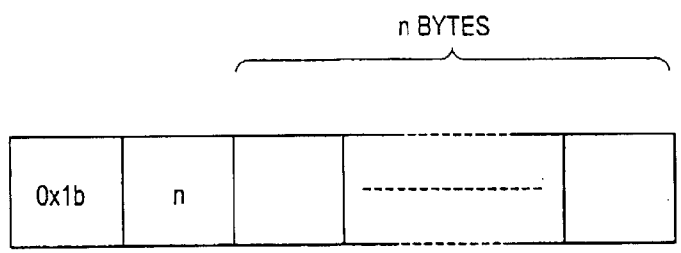
FIG. 3 is explanatory views showing an example format of a command used in the interface apparatus according to the present invention.
Figure 3B:
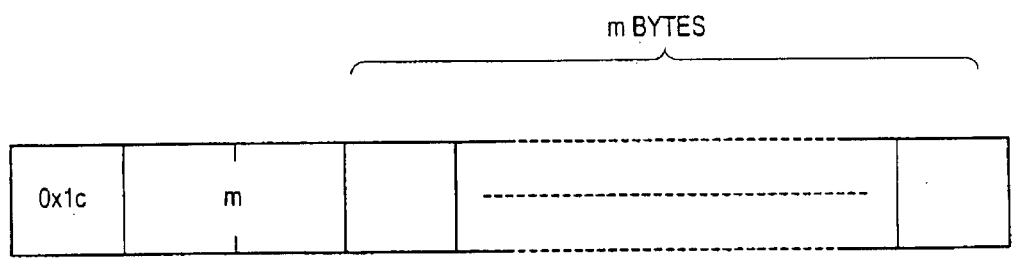

A second method is according to an embodiment arranged such that a command is started with a specific byte, the length of the entire command is included in the first part of the command, and the length is compared with the number of bytes received, thereby determining whether or not transfer of the command has been completed. For example, suppose the first part of a command is either 27 (0x 1b in the hexadecimal notation) or 28 (0x1c in the hexadecimal notation). In the former case, the method indicates the following part made of one byte and a length n of the subsequent entire command. In the latter case, the method indicates the following part made of two bytes and a length m of the subsequent entire command. FIG. 3(*a*) is an explanatory view of a format starting with 0x1b, and FIG. 3(*b*) is an explanatory view of a format starting with 0x1c.

In the present embodiment, the state turns to the command-wait state upon receipt of 0x1b, and value n of a byte subsequently received represents the subsequent command length, and completion of the command is detected when an n byte is received thereafter. This similarly applies when 0x1c is received.

Figure 4:
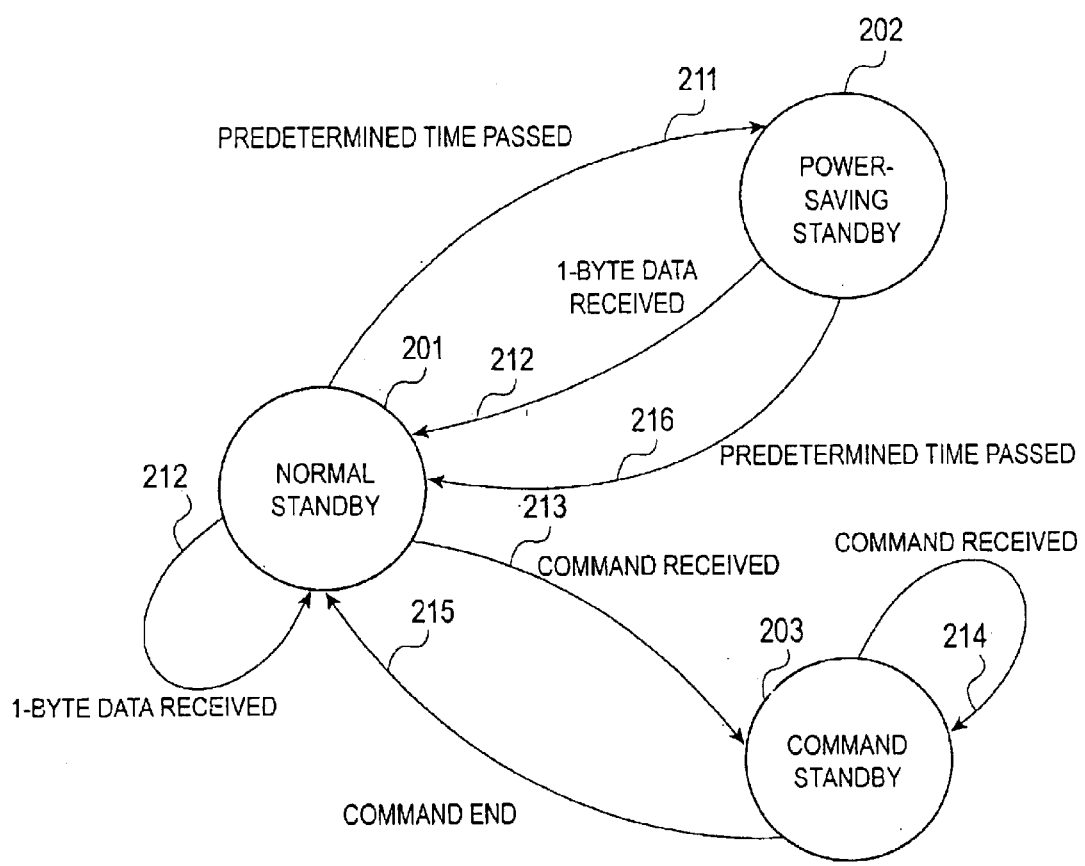
FIG. 4 is a state-transition view of a second example of the embodiment of the interface apparatus according to the present invention.

FIG. 4 shows a state-transitional view of a second example of the embodiment of the interface apparatus according to the present invention. The same reference symbols are used for states similar to those in the state-transitional view shown in FIG. 2. Hereinbelow, referring to FIG. 4, a description will be given of an operational flow of the second example of the embodiment according to the present invention.

The second embodiment is almost the same as the first embodiment, but is different in that it employs a sixth transition 216. In the present embodiment, the passed time is clocked by the timer 134 after the state turns to a power-saving state 202, and the state returns to a normal-wait state 201 according to the sixth transition 216 after a predetermined time (for example, 10 seconds) passes.

At this time, in conjunction with the sixth transition 216, the CPU 131 can post a notification regarding the state returning to the normal-wait state 201 to the first host 111 via a sending section 113 and to the second host 121 via the second sending section 123.

Also, in the present embodiment, in conjunction with the first transition 211, the CPU 131 can post a notification regarding the state shifting to a power-saving state 202 to the first host 111 via the sending section 113 and to second host 121 via the second sending section 123.

According the aforementioned notification, the first host 111 and the second host 121 can determine whether or not the interface apparatus 101 is in the power-saving state.

As a matter of course, an embodiment may be such that one or a plurality of notifications is posted, or no notification is posted.

Figure 5:
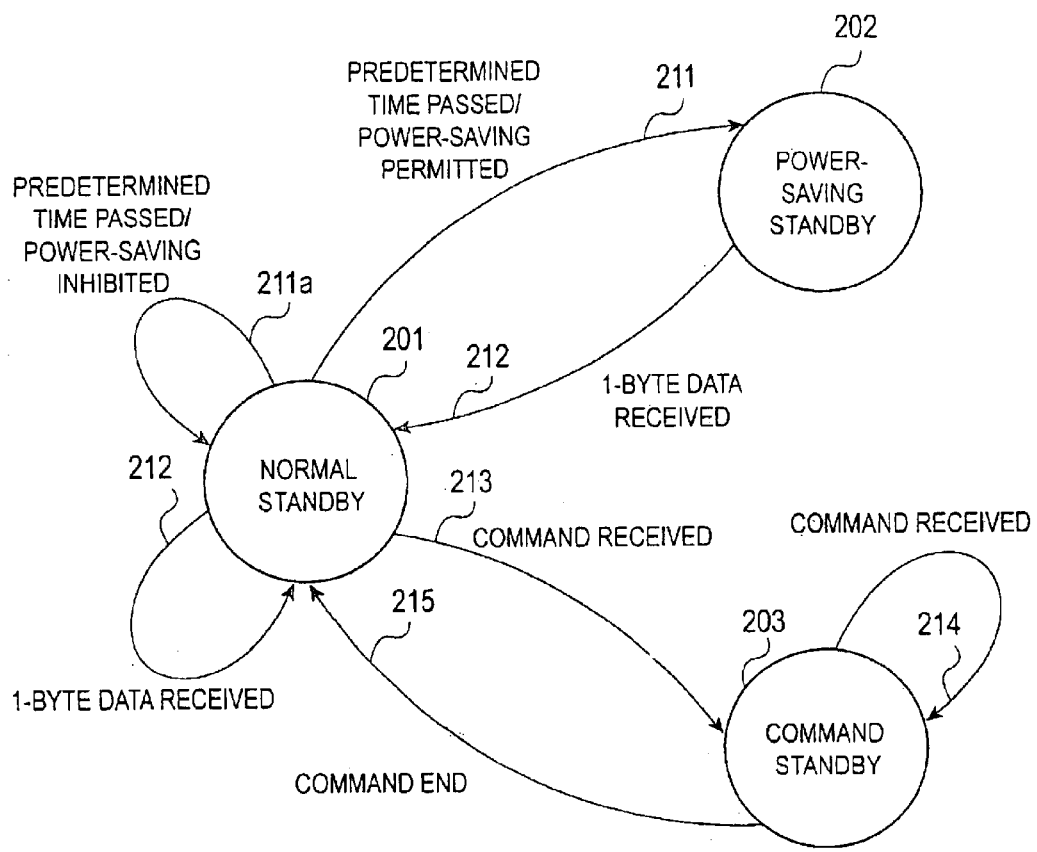
FIG. 5 is a state-transitional view of a third example of the embodiment of the interface apparatus according to the present invention.

FIG. 5 shows a state-transitional view of a third embodiment of an interface apparatus according to the present invention. The same reference symbols are used for states similar to those in the state-transitional view shown in FIGS. 2 and 4. Hereinbelow, referring to FIG. 5, a description will be given of an operational flow of the third embodiment according to the present invention.

The third embodiment is almost the same as the first embodiment, but it is different in that a first transition 211 in the latter case is divided into a first transition 211 and a first-a transition 211*a*.

In the third embodiment, when the interface apparatus 101 receives a command, in addition to the above-described processing, the CPU 131 checks whether the command is a power-saving-wait inhibiting command, a power-saving-wait enabling command, and other commands. If the command is the power-saving-wait inhibiting command, the state where power-saving wait is currently inhibited is recorded in the RAM or the like. If the command is the power-saving-wait enabling command, the state where power-waving wait is currently enabled.

In a case where, from the information recorded in the RAM or the like, the power-saving wait is found to be inhibited even after time exceeds a predetermined time, the CPU 131 does not select the first transition 211, but selects the first-a transition 211*a* to allow the normal-wait state 201 to continue.

Another implementing method that can be considered is such that the CPU 131 commands the timer 134 to stop clocking the passed time when the power-saving-wait inhibiting command is received, and the CPU 131 allows the timer 134 to clock the passed time when the power-saving-wait inhibiting command is received. When the timer 134 is stopped, since the state where the predetermined time passes over is not detected, the normal-wait state 201 remains to continue.

In this connection, an embodiment may be either such that the power-saving-wait inhibiting command and the enabling command are further sent from the interface apparatus 101 to the second host 121 or such that the commands are not sent thereto. In the former case, the interface apparatus 101 performs filtering processing for the commands sent from a first host 111 to the second host 121. In the latter case, according to receipt of the commands by the second host 121, the second host 121 even in the power-saving state is allowed to return therefrom to the normal-wait state; thereby, it can start preparation for receiving a large number of commands and a large amount of data.

In the above, the second embodiment and the third embodiment have been separately described. However, a combined embodiment of these embodiments may be employed. The combined embodiment is also included in the technical scope of the present invention. Particularly, according to principles of the present invention, the applicant business employs the embodiment to allow the first host 111 to monitor and control the power-saving state of the interface apparatus 101, and in addition, to allow the first host 111 to manage the power-saving state of the second host 121. This particular embodiment is also included in the technical scope of the present invention.

To use the interface apparatus 101 as an interface between a printer and a computer, an embodiment may be such that the interface apparatus 101 of the present invention is entirely inserted in an extended slot that has a printer. In the embodiment, since the interface apparatus 101 and the printer are integrated into a single unit, it looks like a single printer when viewed from the outside. Therefore, connection of cables and transportation can be easily carried out, and restrictions regarding the space for installation of components are reduced. Internally, two apparatuses, that is, the interface apparatus 101 and a printer, operate. However, each of the apparatuses is constructed to have a power-saving function; therefore, the integrated unit functions as a power-saving printer.

The first host 111 and the second host 121 are not in the relationship of a master and a slave. Therefore, for example, the first host 111 is used as a printer, and the second host 121 is used as a computer, wherein data to be exchanged therebetween can be used as printer-status information. Also, the printer can be used so as to control the power-saving function of the interface apparatus 101.

Also, when one of the first host 111 and the second host 121 is used as a computer, the interface apparatus 101 of the present invention is capable of serving as a power-saving hub for networks. An embodiment so arranged is also included in the technical scope of the present invention. In this case, a component that corresponds to, for example, the "command" or "data" is used as a packet, in which determination is made whether a high-speed transfer is required or whether a delayed transfer is permitted. For example, in a case where a TCP/IP is used as a communication protocol, communication can also be made with a hub. Therefore, the communication with the hub can be used for transmission of a power-saving definition command.

Figure 6:
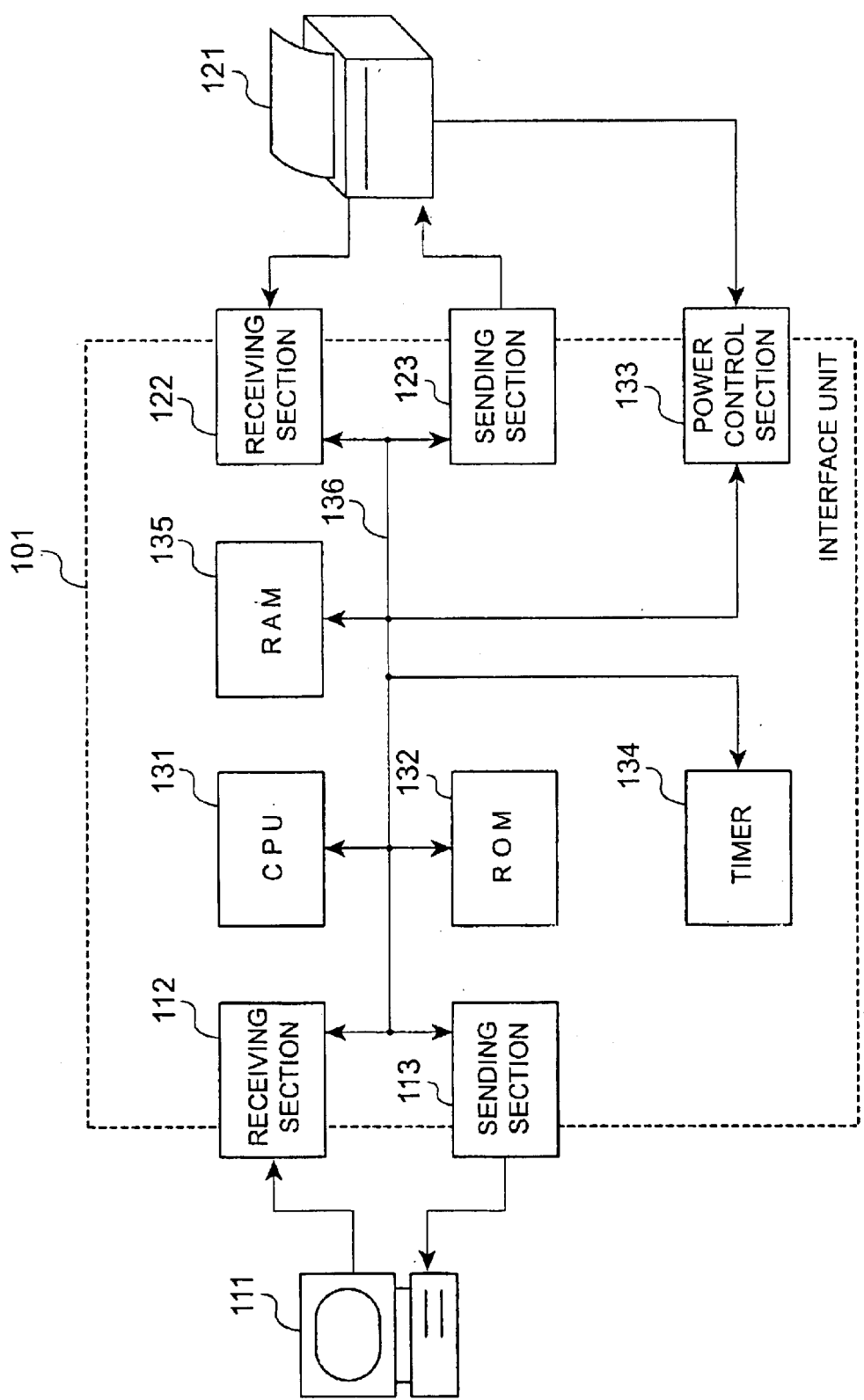
FIG. 6 is a block configuration view of a fourth example of an embodiment of an interface apparatus according to the present invention.

Hereinbelow, a description will be given of a fourth embodiment of the present invention. FIG. 6 is a block configuration view of an example of the embodiment of an interface apparatus according to the present invention. Hereinbelow, referring to FIG. 6, a description will be given of the configuration of the example of the embodiment according to the present invention.

In an interface apparatus 101, a receiving section 112 receives either data and commands that are sent from a first host 111 (for example, a computer), and they are sent from a second sending section 123 to a second host 121 (for example, a printer). This is a basic flow of data and commands. However, with the additional provision of a second receiving section 122 and a first sending section 113, the data and the commands can be adversely sent from the second host 121 to the first host 111.

An embodiment that does not have the first receiving section 112 or the sending section 113 may be employed. The embodiment is arranged such that power is fed to an interface board. In this, the interface board and a printer correspond to the "second host" and the "interface apparatus", respectively.

When a section such as the first receiving section 112 receives data and commands, an interrupt is generated for a CPU 131, and the CPU 131 executes reception-interrupting processing. Thus, the CPU 131 controls transmission. A program for implementing control that is executed by the CPU 131 is stored in a ROM 132 (read-only memory), and when the interface apparatus 101 is powered on, the CPU 131 reads out the program therefrom and executes it. At this time, varying the frequency of clocks to be fed to the CPU 131 allows reduction in power consumption.

The second sending section 123 sends commands and data that are sent from the first host 111, and in addition, can post a notification on a current status of the interface apparatus 101 to the second host 121.

A power control section 133 receives power from the second host 121 and distributes the power to sections, such as the CPU 131, the first receiving section 112, the sending section 113, the second receiving section 122, and the sending section 123. In addition, it controls current, voltage, clocks, and the like, which are to be fed, and either turns them to a power-saving state or returning them in the power-saving state to a normal state. The power distribution is complicated, so that it is not shown in figures; however, a known technical method may be employed therefor.

A timer 134 is used to check whether or not a predetermined time has passed. For example, when intermittent operations are performed in a power-saving mode, the state is shifted between a normal-wait state and a power-saving-wait state; thereby, a power-saving function is implemented.

Data can be exchanged among the first receiving section 112, the sending section 113, the second receiving section 122, the second sending section 123, the CPU 131, and the ROM 132 via a bus 136.

To flow data and commands from the side of the first host 111 to the bus 136, the first receiving section 112 performs conversion of voltage, current, impedance, frequency, protocol (communication procedures), and the like. To flow data and commands from the bus 136 to the side of the second host 121, the second sending section 123 performs conversion of voltage, current, impedance, frequency, protocol, and the like. Depending on the case, the CPU 131 can governs the aforementioned conversions.

The ROM 132 can be used to store the device-type names data on power-supply capacities of second hosts already ex-worked.

Also, the RAM 135 (random access memory) may be connected to the bus 136. The RAM 135 may be used either as a temporary storage area or as a buffer area for data and commands that are transferred.

The second receiving section 122 and the sending section 123 function as sending and receiving means; the power control section 133 functions as a power-supplying means; the CPU 131 functions as a power-information receiving means and a determining means in cooperation with the second receiving section 122; the ROM 132 or the RAM 135 functions as a storing means; the CPU 131 functions as a second determining means in cooperation with the power control section 133; the first receiving section 112 functions as a receiving means; and the CPU 131 functions as a transferring means in cooperation with the sending section 123.

In the following description, the second host 121 may be referred to in a shortened form as a "host 121".

Figure 7:
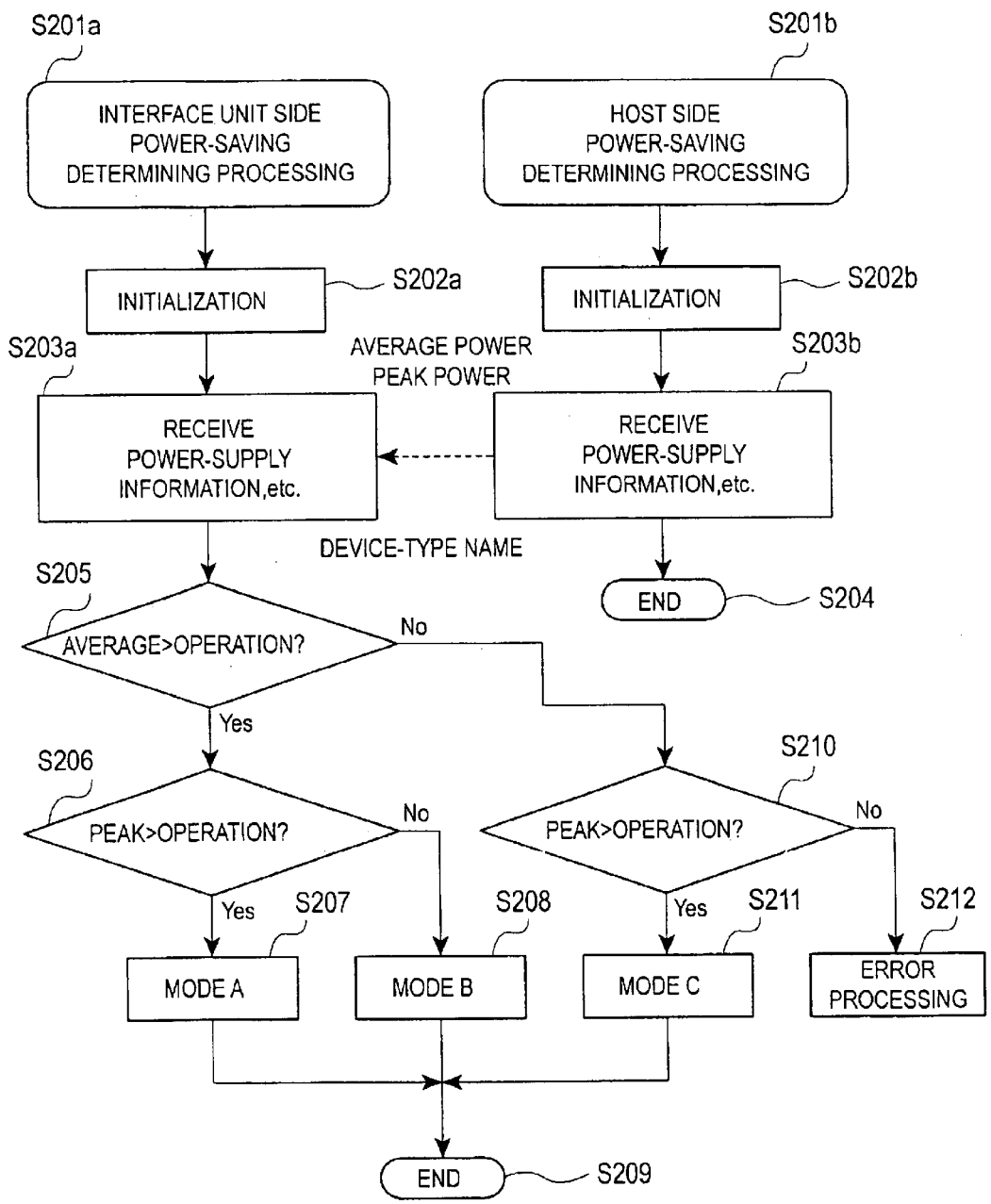
FIG. 7 is a flowchart showing a fourth example of an embodiment of a power-saving determining processing of the interface apparatus according to the present invention.

FIG. 7 is a flowchart showing power-saving determining processing of a first example of the embodiment of the interface apparatus according to the present invention. Hereinbelow, referring to FIG. 7, a description will be given of the first example of the power-saving determining processing.

When the host 121 is powered on, the power is supplied to the interface apparatus 101; thereby, initialization is started. Then, the power-saving determining processing starts (step S201a and step S201b).

First, the interface apparatus 101 and the host 121 perform initialization at the time of their activation (step S202a, step S202b).

Subsequently, the host 121 sends data of information on the power-supplying capacity of its own to the interface apparatus (step S203b), and the interface apparatus 101 receives the data (step S203a).

As the information on the power-supplying capacity, an average supply capacity, a peak-time supply capacity, and the like can be considered. Also, together with the information or instead of the information, the device-type name of the host 121 may be transmitted.

Upon completion of the above transmission, the host 121 returns to a state where it is ready to perform normal processing (step S204).

The interface apparatus 101 acquires data on an operating power for its own, which is prestored in the ROM 132 or the like, and checks whether the average supply capacity is larger than the operating power (step S205).

If the average supply capacity is larger (YES at step 205), the system checks whether the peak-time supply capacity is larger than the operating power (step S206). If the peak-time supply capacity is larger (YES at step S206), a power-saving mode A is selected (step S207). If it is smaller (NO at step S206), a power-saving mode B is selected (step S208). Thereafter, processing terminates (step S209).

If the peak-time supply capacity is larger ("No" step at S205), the system checks whether the peak-time supply capacity is larger than the operating power (step S210). If it is larger (YES at step S210), a power-saving mode C is selected (step S211), and processing terminates (step S209). On the other hand, the peak-time supply capacity is smaller (NO at step S210), since the interface apparatus 101 does not operate with the power supplied from the host 121, error processing is performed (step S212).

The error processing that can be considered includes that lamps (not shown) on the interface apparatus 101 are turned ON to blink, a buzzer (not shown) is turned ON to sound, and a status notification is posted to the host 121 so as to report to a user that the unit cannot be operated via the host 121.

The aforementioned power-saving modes A, B, and C that can be considered include the following:

(a) The power-saving mode A optimizes power-saving control, but does not perform the power-saving control when priority is given to communication speeds.

(b) The power-saving mode B either weakens the power-saving control or does not perform the power-saving control.

(c) Power-saving mode B always optimizes the power-saving control.

These divisional conditions and power-saving modes may be classified more in particular depending on the capacity of the interface apparatus 101 depending upon the condition, and an embodiment so arranged is included in the technical scope of the present invention.

Figure 8:
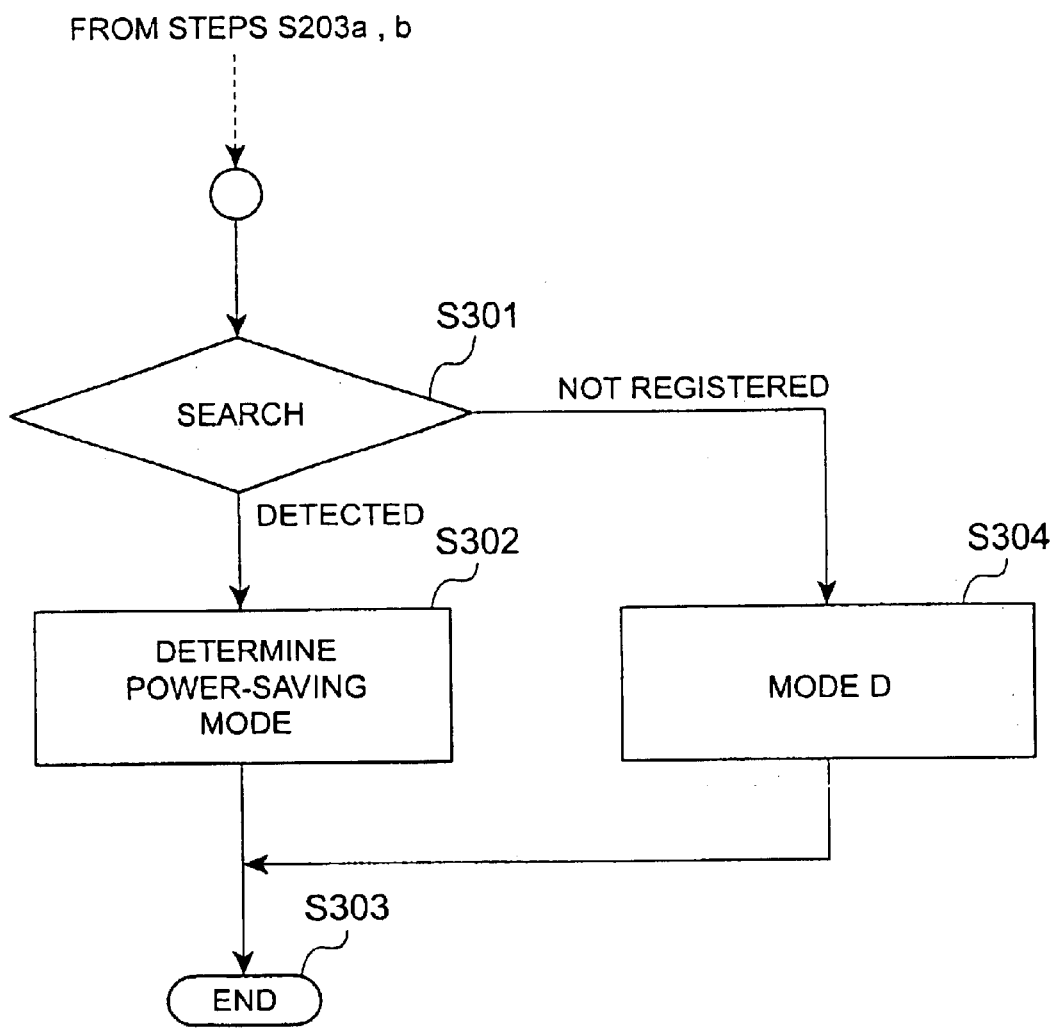
FIG. 8 is a flowchart showing a fifth example of an embodiment of a power-saving determining processing of the interface apparatus according to the present invention.

FIG. 8 is a flowchart showing power-saving determining processing of a fifth example of an embodiment of the interface apparatus according to the present invention. Hereinbelow, referring to FIG. 8, a description will be given of a second example of embodiment of the power-saving determining processing.

Depending on the manufactured period of the host 121, although the device-type name thereof can be sent to the interface apparatus 101, there are cases where information on the power-supplying capacity cannot be sent thereto. That is, there are cases where information on the average supply capacity and the peak-time supply capacity cannot be obtained in step S203a and step S203b.

When the present example is employed, even in a case where a host 121 of such an old device type is connected, an appropriate power-saving mode can be selected.

Hereinbelow, assuming that the device-type name of the host 121 has been already exchanged in step S203a and step S203b, a description will be given of processing thereafter, because the processing theretofore is the same as in the case of the first example.

On a key of the device-type name of the host 121, which was received in step S203a, the interface apparatus 101 searches a table stored in the ROM 132 (step S301). FIG. 9 is an explanatory drawing showing a table of device-type names and data on the power-supplying capacity of an example of the embodiment of the power-saving determining processing of the interface apparatus according to the present invention.

In a table 401, information is stored as a record 402 per device type in an area 403 for storing the device-type name, an area 404 for storing the average supply capacity, and an area 405 for storing the peak-time supply capacity.

As a result of the search process, if information that corresponds to the host 121 is detected ("DETECTED" in step S301), information on an average supply capacity and a peak-time supply capacity that correspond to the device type is retrieved, thereby determining the power-saving mode (step S302). Thereafter, processing terminates (step S303). In the determining processing, processing steps similar to steps S205 to S212 in the first example may be employed.

As a result of the search process, if information that corresponds to the host 121 is not detected ("NOT REGISTERED" in step S301), a power-saving mode D that corresponds thereto is selected, then, processing terminates. As the power-saving mode D, the following can be considered:

The power-saving control is not performed.

Standard power-saving control is performed.

Error processing is performed.

Figure 10:
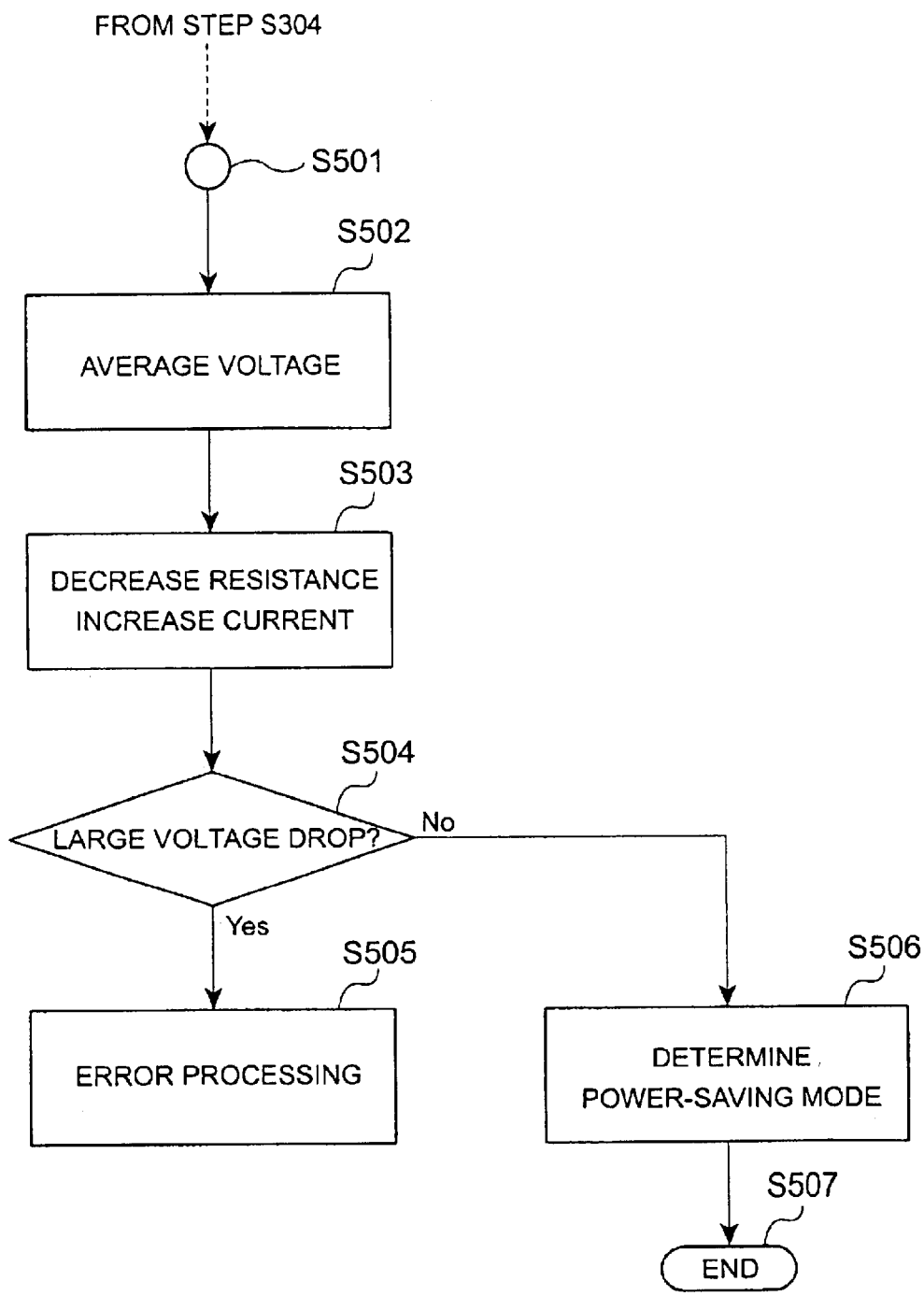
FIG. 10 is a flowchart showing a sixth example of an embodiment of a power-saving determining processing of the interface apparatus according to the present invention.

Hereinbelow, a description will be given of a sixth example corresponding to the fifth example of the power-saving determining processing of the interface apparatus. FIG. 10 shows a flowchart of a third example of a power-saving determining processing. Using the present example allows an appropriate power-saving mode to be selected even in a case where the device-type name of the host 121 connected to the interface apparatus 101 is not registered in the table stored in the ROM 132 and even in a case where the host 121 cannot send the device-type name. For example, the cases are that processing is passed to step S304 in the fifth example.

This determining processing is started (step S501) when processing is passed to step S304. First of all, the CPU 131 controls the power control section so as to set an apparent resistance of the interface apparatus 101 to a load resistance in an average operation and measures voltage supplied in the average operation. This allows an average load exerted on the host 121 to be known.

Subsequently, the apparent resistance of the interface apparatus 101 is set to be the lowest resistance during operation (step S503). That is, the above is a case where the load is maximally exerted on the host 121, at which time the maximum voltage is applied to the interface apparatus 101.

As a result, voltage of the power supplied from the host 121 gradually decreases. FIG. 11 shows explanatory drawings that indicate variations in voltage of the power supplied in an example of the embodiment of the interface apparatus according to the present invention.

In addition to the above, the CPU 131 observes the condition of the voltage drop and determines whether or not the voltage reached to a predetermined voltage within a predetermined period of time (step S504). In this case, for the predetermined voltage, the minimum voltage required for operation of the interface apparatus 101 may be employed.

Figure 11A:
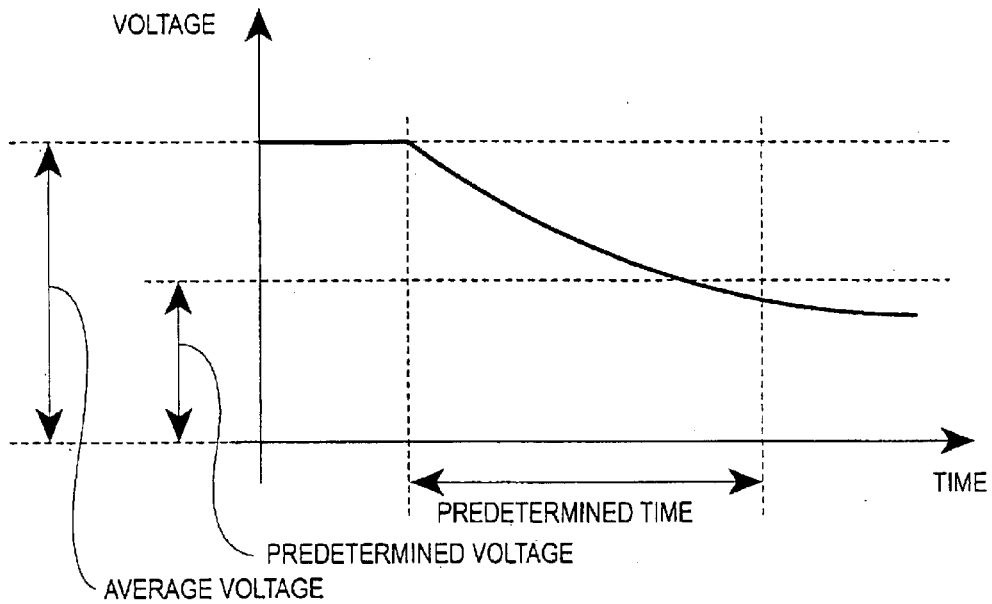
FIG. 11 shows explanatory drawings showing variations in voltage of power supplied in the fourth example of the embodiment of the power-saving determining processing of the interface apparatus according to the present invention.

When the voltage reaches the predetermined voltage within the predetermined period of time (YES at step S504), since the interface apparatus 101 cannot be driven with the power supplied by the host 121, error processing is performed (step S505). The error processing is similar to that at step S212 described above. The condition of the voltage drop in the above case is shown in FIG. 11(a).

Figure 11B:
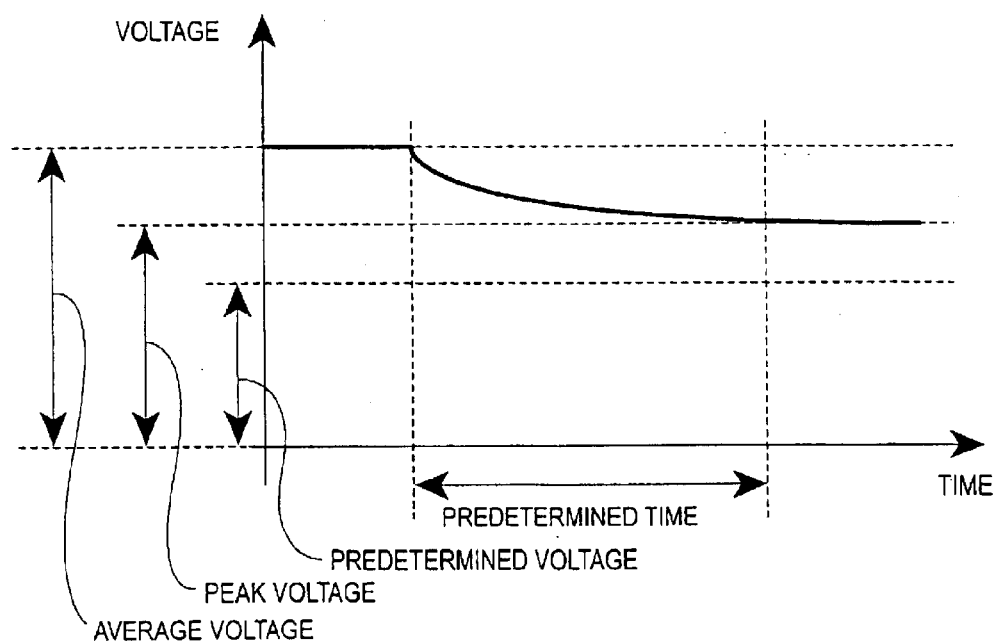

When the voltage does not reach the predetermined voltage within the predetermined period of time (NO at step S504), power-saving control is determined so as to be selected corresponding to the value of voltage when the predetermine time passes (step S506). Thereafter, processing terminates (step S507). The larger the value of voltage, the higher the capacity of a power source is prepared in the host 121. The condition of the voltage drop in the above case is shown in FIG. 11(b).

Calculations can be performed for the average supply capacity from the voltage in step S502 and for the peak-time supply capacity from the voltage in step S504. With the calculation results thus obtained, processing similar to steps S205 to S212 in the first example can be performed in step S506.

For the predetermined time, for example, one second may be employed. Also, an embodiment may be employed which interprets a case where voltage variation ceased to the effect that the predetermined time passed over.

For the ROM 132, one of a flash EEPROM (electrically erasable programming ROM) and a hard disk may be employed. When the interface apparatus 101 is connected to a device of a type not stored in the ROM 132, the ROM 132 may be used to additionally store information on the power-supplying capacity, which was detected by performing experiments to vary the information on the power-supplying capacity, which was received from the second host 121, and the load exerted on the interface apparatus 101. In this case, the interface apparatus 101 of the present invention increases information in its storage and increasingly becomes sophisticated each time it is connected to an unknown host.

Also, in step S203a, the interface apparatus 101 receives the power-supplying capacity and the device-type name from the host 121. In this connection, an embodiment may be employed which is arranged such that, in a case where one of the interface apparatus 101 and the host 121 stores a table as shown in FIG. 9, they can exchange the table with each other to add new information not stored in each side, thereby becoming even more sophisticated. An embodiment so arranged is also included in the technical scope of the present invention.

Also, there are many hosts of a type that cannot send information on the power-supplying capacity while they can send the device-type name. In this case, after a single experiment is carried out to recognize a device type, the information in the table stored in the ROM 132 can be used. This allows reduction in time for initialization and in the load of the power source for the host to be implemented.

To use the interface apparatus 101 as an interface between a printer and a computer, an embodiment may be such that the interface apparatus 101 of the present invention is entirely inserted in an extended slot that has a printer. In the embodiment, since the interface apparatus 101 and the printer are integrated into a single unit, it looks like a single printer when viewed from the outside. Therefore, connection of cables and transportation can be easily carried out, and restrictions regarding the space for installation of components are reduced. Internally, two apparatuses, that is, the interface apparatus 101 and a printer, operate. However, each of the apparatuses is constructed to have a power-saving function; therefore, the integrated unit functions as a power-saving printer.

In addition, as described above, the present invention is applicable to any interface apparatus that receives power from any one of multiple hosts it interfaces. For example, the invention is applicable to network hubs and modems. Embodiments so arranged are also included in the technical scope of the present invention.

INDUSTRIAL APPLICABILITY

As described-above, according to the present invention, advantages described below are produced.

First, that allows data and commands to be transferred between two hosts so as to serve as an interface for communication therebetween, and shifts to a power-saving state as and when required, thereby allowing power consumption to be reduced, and concurrently, that does not shift to the power-saving wait state during command reception, thereby allowing commands to be transferred at a high speed; and a control method therefor can be provided.

Second, the interface apparatus arranged such as that either one of a first host and a second host or the both for which the interface apparatus serves as an interface can recognize a current status of the interface apparatus and the control method therefore can be provided. The host that received a notification can either shift to a power-saving wait state or return to a normal-wait state, thereby allowing a high communication speed to be maintained.

Third, the interface apparatus arranged such that transition of the interface apparatus to the power-saving wait state can be controlled via the first host, and the transition is inhibited, thereby allowing data and commands to be transferred at a high speed; and the control method therefor can be provided.

Particularly, the interface apparatus arranged such that the first host recognizes a current status of the interface apparatus, thereby allowing precise power-saving control to be implemented; and the control method therefor can be provided.

Fourth, the interface apparatus arranged such that it receives power required for operation from the connected host and obtains information required for saving power from the host, thereby being capable of independently determining the power-saving mode, and the control method therefor can be provided.

Fifth, the interface apparatus arranged such that it can determine a mode most suitable to the power-supplying capacity of a host even in a case where the host cannot send power-supplying capacity information on its own while it can send the device-type name, and the control method therefor can be provided.

Sixth, the interface apparatus arranged such that it experimentally measures the power-supplying capacity of a host even in a case where the host can not send the power-supplying capacity information nor can it send information on the device-type name, thereby determining the power-saving mode most suitable to the power-supplying capacity of the host, and the control method therefor can be provided.

Seventh, the interface apparatus that can serve as an interface for data transfer between two hosts, and the control method can be provided.

Eighth, an information-storing medium containing a program can be easily distributed or sold independently of the interface apparatus. By execution of the program recorded in the information-storing medium of the present invention in the interface apparatus, the interface apparatus and the control method therefore according to the above-described present invention can be realized.

Particularly, any one of a compact disk (so-called a CD-ROM), a floppy disk, an optical magnetic disk, a digital videodisk (so-called a DVD-ROM), and a magnetic tape can be employed as the information-storing medium containing the program. Using one of these information-storing medium, these programs can be installed in existing interface apparatuss.

In addition, these programs can be registered at a WWW (World Wide Web) site so as to allow users to download and install them on existing interface apparatuss.

Also, in the above and hereinbelow, a printer as a host and a computer as another host are individually employed and described. However, other electronic information apparatuses can be easily employed as hosts, and embodiments so arranged are included in the technical scope of the present invention.

Also, the interface apparatus of the present invention can be applied to a network hub, a modem, or the like that serve as an interface for multiple units such as computer.

Furthermore, the present invention can be applied to an embodiment arranged such that, between a printer and an interface board to be equipped with the printer, the interface board supplies power to the printer.

What is claimed is:

1. An interface apparatus, comprising:
   a first transmission section in communication with a first host unit;
   a second transmission section in communication with a second host unit;
   the first transmission section being configured to receive data from the first host unit and to send data received by the second transmission section to the first host unit, and the second transmission section being configured to receive data from the second host unit and to send data received by the first transmission section to the second host unit; and
   a controller that selects one of a normal-wait state, a command-wait state or a power-saving wait state, based on the data transmitting activity of both the first and second host units, and the type of any data being transmitted, the controller comprising:
   a power-information receiver that receives information regarding power-supplying capacity of the second host unit, wherein power is supplied from the second host unit to the interface apparatus in accordance with a power saving mode determined according to the power-supplying capacity information on the second host unit received by the power-information receiver.

2. The interface apparatus as stated in claim 1, wherein the controller comprises:
   a control-command detector that interprets the data received from the first host unit to extract control commands,
   a wait-state selector that
   selects the normal-wait state when the data was found by the control-command detector to be data other than a control command, and
   selects the command-wait state when the data was found to be a control command by the control-command detector,
   a command-completion recognizer that recognizes completion of a control command extracted by the control-command detector, wherein the controller resets the command-wait state and selects the normal-wait state when completion of the control command is recognized by the command-completion recognizer,
   the interface further comprising a first clock that measures time after the normal-wait state is selected, and
   wherein the controller resets the normal-wait state and selects the power-saving wait state when a first predetermined amount of time has passed, as determined by the first clock, after the normal-wait state is selected.

3. The interface apparatus as stated in claim 2, further comprising:
   a first notifier that posts a notification to the first host unit when the power-saving wait state is selected.

4. The interface apparatus as stated in claim 3, further comprising:
   a second notifier that posts a notification to the second host unit when the power-saving wait state is selected.

5. The interface apparatus as stated in claim 4, further comprising:
   a second clock that measures time after the power-saving wait state is selected, and
   wherein the controller resets the power-saving wait state and selects the normal-wait state when a second predetermined amount of time has passed, as determined by the second clock, after the power-saving wait state is selected.

6. The interface apparatus as stated in claim 5, further comprising:
   a third notifier that posts a notification to the first host unit when the power-saving wait state is reset.

7. The interface apparatus as stated in claim 6, further comprising:
   a fourth notifier that posts a notification to the second host unit when the power-saving wait state is reset.

8. The interface apparatus as stated in claim 2, wherein the controller further comprises:
   a control-command interpreter that interprets a control command detected by the control-command detector, and
   wherein the controller inhibits selection of the power-saving wait state when a predetermined control command is interpreted by the control-command interpreter.

9. A control method for an interface apparatus, comprising the steps of:
   (a) receiving data from a first host unit and sending that received data to a second host unit;
   (b) receiving data from the second host unit and sending that received data to the first host unit; and
   (c) selecting one of a normal-wait state, a command-wait state or a power-saving wait state, based on the data transmitting activity to and from the first and second host units;
   (d) receiving information regarding power-supplying capacity of the second host unit; and
   (e) supplying power from the second host unit to the interface apparatus in accordance with a power saving mode determined according to the received power-supplying capacity information on the second host unit.

10. The control method for an interface apparatus as stated in claim 9, wherein wait-state selecting step (c) comprises:
   (c)(1) interpreting the data received from the first host unit to extract control commands, (c)(2) selecting the normal-wait state when the data was found to be data other than a control command in control-command extracting step (c)(1), (c)(3) selecting the command-wait state when the data was found to be a control command in control-command extracting step (c)(1), (c)(4) recognizing completion of a control command extracted in control-command extracting step (c)(1), (c)(5) resetting the command-wait state and selecting the normal-wait state when completion of the control command is recognized in command-completion recognizing step (c)(4), (c)(6) measuring time after the normal-wait state is selected, and (c)(7) resetting the normal-wait state and selecting the power-saving wait state when a first predetermined amount of time has passed, as determined in time measuring step (c)(6).

11. The control method for an interface apparatus as stated in claim 10, further comprising the step of:

(f) posting a notification to the first host unit when the power-saving wait state is selected by power-saving-wait-state selecting step (c)(7).

12. The control method for an interface apparatus as stated in claim 11, further comprising the step of:

(g) posting a notification to the second host unit when the power-saving wait state is selected in power-saving-wait-state selecting step (c)(7).

13. The control method for an interface apparatus as stated in claim 12, wherein wait-state selecting step (c) further comprises:

(c)(8) measuring time after the power-saving wait state is selected, and (c)(9) resetting the power-saving wait state and selecting the normal-wait state when a second predetermined amount of time has passed, as determined in time measuring step (c)(8).

14. The control method for an interface apparatus as stated in claim 13, further comprising the step of:

(h) posting a notification to the first host unit when the power-saving wait state is reset in power-saving-wait-state resetting step (c)(9).

15. The control method for an interface apparatus as stated in claim 14, further comprising the step of:

(i) posting a notification to the second host unit when the power-saving wait state is reset in power-saving-wait-state resetting step (c)(9).

16. The control method for an interface apparatus as stated in claim 15, further comprising the steps of:

(j) interpreting a control command detected in control-command extracting step (c)(1); and (k) inhibiting selection of the power-saving wait state in power-saving-wait-state selecting step (c)(7) when a predetermined control command is interpreted in control-command interpreting step (j).

17. A computer-readable information-recording medium for storing a computer program for implementing a control method for an interface apparatus, the program comprising instructions for:

(a) receiving data from a first host unit and sending that received data to a second host unit;

(b) receiving data from the second host unit and sending that received data to the first host unit;

(c) selecting one of a normal-wait state, a command-wait state or a power-saving wait state, based on the data transmitting activity to and from the first and second host units;

(d) receiving information regarding power-supplying capacity of the second host unit; and (e) supplying power from the second host unit to the interface apparatus in accordance with a power saving mode determined according to the received power-supplying capacity information on the second host unit.

18. The information-recording medium as stated in claim 17, wherein wait-state selecting instruction (c) comprises:

(c)(1) interpreting the data received from the first host unit to extract control commands, (c)(2) selecting the normal-wait state when the data was found to be data other than a control command in control-command extracting step (c)(1), (c)(3) selecting the command-wait state when the data was found to be a control command in control-command extracting step (c)(1), (c)(4) recognizing completion of a control command extracted in control-command extracting step (c)(1), (c)(5) resetting the command-wait state and selecting the normal-wait state when completion of the control command is recognized in command-completion recognizing step (c)(4), (c)(6) measuring time after the normal-wait state is selected, and (c)(7) resetting the normal-wait state and selecting the power-saving wait state when a first predetermined amount of time has passed, as determined in time measuring step (c)(6).

19. The information-recording medium as stated in claim 18, further comprising instructions for:

(f) posting a notification to the first host unit when the power-saving wait state is selected in power-saving-wait-state selecting step (c)(7).

20. The information-recording medium as stated in claim 19, further comprising instructions for:

(g) posting a notification to the second host unit when the power-saving wait state is selected in power-saving-wait-state selecting step (c)(7).

21. The information-recording medium as stated in claim 20, wherein wait-state selecting instruction (c) further comprises:

(c)(8) measuring time after the power-saving wait state is selected, and (c)(9) resetting the power-saving wait state and selecting the normal-wait state when a second predetermined amount of time has passed, as determined in time measuring step (c)(8).

22. The information-recording medium as stated in claim 21, further comprising instructions for:

(h) posting a notification to the first host unit when the power-saving wait state is reset in power-saving-wait-state resetting step (c)(9).

23. The information-recording medium as stated in claim 22, further comprising instructions for:

(i) posting a notification to the second host unit when the power-saving wait state is reset in power-saving-wait-state resetting step (c)(9).

24. The information-recording medium as stated in claim 23, further comprising instructions for:

(j) interpreting a control command detected in control-command extracting step (c)(1); and (k) inhibiting selection of the power-saving wait state in power-saving-wait-state selecting step (c)(7) when a predetermined control command is interpreted in control-command interpreting step (j).

25. An interface apparatus, comprising:
- a receiving section in communication with a first host unit to receive data therefrom;
- a sending section in communication with a second host unit to send the data received by the receiving section from the first host unit to the second host unit;
- a controller that selects a predetermined wait state from a plurality of wait states according to operation of the receiving section or the sending section; and
- a power-supply having a plurality of power-saving modes and which supplies power, supplied from the second host unit, to the interface apparatus, wherein the controller comprises:
  - a power-information receiver that receives information regarding power-supplying capacity of the second host unit, and
  - wherein the power-saving mode to be employed by the power-supply is determined according to the power-supplying capacity information on the second host unit received by the power-information receiver.

26. The interface apparatus as stated in claim 25, further comprising:
- a storage medium that stores device-type-name information and the power-supplying capacity information on the second host unit; and
- a first determiner that searches the storage medium for device-type-name information on the second host unit, which was received from the power-information receiver, and determines the power-saving mode to be employed by the power-supply according to the obtained power-supplying capacity information on the second host unit.

27. The interface apparatus as stated in claim 25, wherein the wait-state selector further comprises a second determiner that recognizes variation in voltage, current or both of power supplied by the second host unit, to thereby determine the power-saving mode employed by the power-supply.

28. A control method for an interface apparatus, comprising the steps of:
- (a) receiving data from a first host unit;
- (b) sending the data received in receiving step (a) to a second host unit;
- (c) selecting a predetermined wait state from a plurality of wait states according to operation of receiving step (a) or sending step (b); and
- (d) supplying power, supplied from the second host unit, to the interface apparatus, and
- wherein wait-state selecting step (c) comprises:
  - (c)(1) receiving information regarding power-supplying capacity of the second host unit via receiving step (a), and
  - (c)(2) determining which one of a plurality of power-saving modes is being to be employed by the interface apparatus according to the power-supplying capacity information on the second host unit received in power-supplying capacity information receiving step (c)(1).

29. A control method for an interface apparatus, as stated in claim 28, wherein wait-state selecting step (c) further comprises:
- (c)(3) storing device-type-name information and the power-supplying capacity information on the second host unit; and
- (c)(4) searching for the device-type-name information included in the power-supplying capacity information on the second host unit, and determining the power-saving mode to be employed by the interface apparatus according to the obtained power-supplying capacity information on the second host unit.

30. The control method for an interface apparatus as stated in claim 28, wherein wait-state selecting step (c) further comprises:
- (c)(5) recognizing variation in voltage, current or both of power supplied by the first host, and
- (c)(6) determining the power-saving mode to be employed in the power-supplying step (d) according to the result of the recognition in recognizing step (c)(5).

31. A computer-readable information-recording medium for storing a computer program for implementing a control method for an interface apparatus, the program comprising instructions for:
- (a) receiving data from a first host unit;
- (b) sending the data received in receiving step (a) from the first host unit to a second host unit;
- (c) selecting a predetermined wait state from a plurality of wait states according to operation of receiving step (a) or sending step (b); and
- (d) supplying power, supplied from the second host unit, to the interface apparatus, and
- wherein wait-state selecting instruction (c) comprises:
  - (c)(1) receiving information regarding the power-supplying capacity of the second host unit via receiving step (a), and
  - (c)(2) determining which one of a plurality of power-saving modes is being to be employed by the interface apparatus according to power-supplying capacity information on the second host unit received in power-supplying capacity information receiving step (c)(1).

32. The information recording medium as stated in claim 31, wherein wait-state selecting instruction (c) further comprises:
- (c)(3) storing device-type-name information and the power-supplying capacity information on the second host unit, and
- (c)(4) searching for the device-type-name information included in the power-supplying capacity information on the second host unit, and determining the power-saving mode to be employed by the interface apparatus according to the obtained power-supplying capacity information on the second host unit.

33. The information recording medium as stated in claim 31, wherein wait-state selecting instruction (c) further comprises:
- (c)(5) a step for recognizing variation in either one of voltage, and current or both of power supplied by the second host unit, and
- (c)(6) determining the power-saving mode to be employed in the power-supplying step (d) according to the result of the recognition in recognizing step (c)(5).

* * * * *